(12) United States Patent
Imai et al.

(10) Patent No.: US 10,324,396 B2
(45) Date of Patent: Jun. 18, 2019

(54) LIGHT SCANNING APPARATUS, IMAGE FORMING APPARATUS, AND HOUSING

(71) Applicant: CANON KABUSHIKI KAISHA, Tokyo (JP)

(72) Inventors: Yuichiro Imai, Tokyo (JP); Yuta Okada, Moriya (JP); Daisuke Aruga, Abiko (JP); Takehiro Ishidate, Tokyo (JP); Yasuaki Otoguro, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/889,802

(22) Filed: Feb. 6, 2018

(65) Prior Publication Data

US 2018/0231914 A1    Aug. 16, 2018

(30) Foreign Application Priority Data

Feb. 15, 2017 (JP) .................................. 2017-025991

(51) Int. Cl.
| | |
|---|---|
| *G03G 15/00* | (2006.01) |
| *G03G 15/04* | (2006.01) |
| *G03G 15/01* | (2006.01) |
| *G02B 26/08* | (2006.01) |
| *G02B 26/12* | (2006.01) |
| *G03G 15/043* | (2006.01) |

(52) U.S. Cl.
CPC ... *G03G 15/04036* (2013.01); *G02B 26/0816* (2013.01); *G02B 26/12* (2013.01); *G03G 15/011* (2013.01); *G03G 15/0189* (2013.01); *G03G 15/0435* (2013.01)

(58) Field of Classification Search
CPC ............. G03G 15/011; G03G 15/0189; G03G 15/04036; G03G 15/0435; G02B 26/0816
See application file for complete search history.

(56) References Cited

U.S. PATENT DOCUMENTS

| 7,072,087 B2 | 7/2006 | Nakahata | .................... 359/204.1 |
| 7,298,390 B2 | 11/2007 | Nakahata | ....................... 347/231 |
| 7,522,326 B1 | 4/2009 | Otoguro | ........................ 347/256 |
| 7,538,924 B2 | 5/2009 | Tomita | .......................... 359/204 |

(Continued)

FOREIGN PATENT DOCUMENTS

| JP | 2006-195421 | 7/2006 |
| JP | 2015-075603 | 4/2015 |

OTHER PUBLICATIONS

U.S. Appl. No. 15/702,219, filed Sep. 12, 2017.
(Continued)

*Primary Examiner* — Hoang X Ngo
(74) *Attorney, Agent, or Firm* — Venable LLP

(57) ABSTRACT

A light scanning apparatus including: a bottom surface on which a rotary polygon mirror is mounted; a housing including a bottom surface on which the rotary polygon mirror is mounted and a side wall portion on which a first light source and a second light source are mounted, the side wall portion standing from the bottom surface; and a wall portion standing from the bottom surface, the wall portion being configured to block a first light beam emitted from the first light source and reflected by an inner wall of a first holder holding the first light source and a second light beam emitted from the second light source and reflected by an inner wall of the second holder holding the second light source.

15 Claims, 9 Drawing Sheets

(56) References Cited

U.S. PATENT DOCUMENTS

| | | | |
|---|---|---|---|
| 7,629,992 B2 | 12/2009 | Nakahata | 347/243 |
| 7,684,099 B2 | 3/2010 | Otoguro | 359/216.1 |
| 7,728,861 B2 | 6/2010 | Nakahata | 347/231 |
| 7,830,576 B2 | 11/2010 | Nakahata | 359/201.1 |
| 8,810,622 B2 | 8/2014 | Mamiya et al. | 347/242 |
| 8,917,305 B2 | 12/2014 | Nakahata et al. | 347/244 |
| 8,922,847 B2 | 12/2014 | Nakahata | 358/474 |
| 8,947,478 B2 | 2/2015 | Lshidate et al. | 347/137 |
| 9,069,279 B2 | 6/2015 | Iwai | G03G 15/0435 |
| 9,086,645 B2 | 7/2015 | Otoguro et al. | G03G 15/0435 |
| 9,195,063 B2 | 11/2015 | Lshidate et al. | G02B 26/125 |
| 9,239,535 B2 | 1/2016 | Iwai et al. | G03G 15/0409 |
| 9,316,992 B2 | 4/2016 | Ishidate et al. | G03G 15/04036 |
| 9,400,444 B2 | 7/2016 | Sato et al. | G03G 15/043 |
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 9,772,577 B2 | 9/2017 | Lshidate et al. | G03G 15/043 |
| 2007/0253048 A1* | 11/2007 | Sakai | G02B 26/124 |
| | | | 359/204.5 |
| 2008/0219601 A1* | 9/2008 | Arai | B41J 2/473 |
| | | | 382/321 |
| 2009/0244670 A1 | 10/2009 | Sato et al. | 359/205.1 |
| 2012/0081770 A1 | 4/2012 | Sato et al. | 359/204.1 |
| 2016/0347083 A1 | 12/2016 | Ishidate | B41J 2/471 |
| 2017/0010558 A1 | 1/2017 | Ishidate et al. | B41J 2/47 |
| 2017/0064108 A1 | 3/2017 | Mamiya et al. | H04N 1/00525 |
| 2017/0336731 A1 | 11/2017 | Ishidate et al. | G03G 15/0435 |

OTHER PUBLICATIONS

U.S. Appl. No. 15/891,087, filed Feb. 7, 2018.
U.S. Appl. No. 15/891,064, filed Feb. 7, 2018.
U.S. Appl. No. 15/706,317, filed Sep. 15, 2017.
U.S. Appl. No. 15/720,644, filed Sep. 29, 2017.
U.S. Appl. No. 15/801,033, filed Nov. 1, 2017.
U.S. Appl. No. 15/895,818, filed Feb. 13, 2018.
U.S. Appl. No. 15/891,071, filed Feb. 7, 2018.
U.S. Appl. No. 15/891,057, filed Feb. 7, 2018.
U.S. Appl. No. 15/889,045, filed Feb. 5, 2018.
U.S. Appl. No. 15/889,052, filed Feb. 5, 2018.
U.S. Appl. No. 15/891,080, filed Feb. 7, 2018.
U.S. Appl. No. 15/908,482, filed Feb. 28, 2018.
U.S. Appl. No. 1 5/718,510, filed Sep. 28, 2017.

* cited by examiner

LIGHT SCANNING APPARATUS, IMAGE FORMING APPARATUS, AND HOUSING

BACKGROUND OF THE INVENTION

Field of the Invention

The present invention relates to an image forming apparatus such as a copying machine, a printer, a fax machine, or a multifunctional peripheral thereof, a light scanning apparatus to be used in the image forming apparatus, and a housing of the light scanning apparatus.

Description of the Related Art

As a light scanning apparatus to be used in an electrophotographic image forming apparatus, there has been known a light scanning apparatus having the following configuration. Specifically, there has been known a light scanning apparatus configured to form a latent image on a surface of a photosensitive member by deflecting a laser beam emitted from a light source with a rotary polygon mirror, condensing the laser beam toward the photosensitive member with an imaging optical system to form beam spots on a photosensitive surface of the photosensitive member, and scanning the surface of the photosensitive member with the beam spots.

Inside the light scanning apparatus, there is provided a deflection device including the rotary polygon mirror configured to deflect and scan a laser beam emitted from a semiconductor laser. The rotary polygon mirror scans the laser beam onto the photosensitive member, and the semiconductor laser emits a beam and stops the beam emission repeatedly in accordance with movement of the photosensitive member. In this manner, a predetermined latent image is obtained on the photosensitive member.

The light source has a small size, and hence it is difficult to handle the light source when the light source is assembled to a circuit board, a housing, or the like. Accordingly, in some cases, a light source holder configured to hold the light source is used, and the light source holder holding the light source is assembled to the circuit board, the housing, or the like. The light source holder has a cylindrical shape similarly to the light source, and may also have a shape for blocking an unnecessary laser beam so as to obtain a necessary light amount on a surface to be scanned. For example, there has been proposed a configuration in which a light blocking member is provided between a passage position of a beam entering a target object from the light source, and a passage position of a beam for performing synchronous detection of beam emission (Japanese Patent Application Laid-Open No. 2006-195421). The light blocking member is provided, thereby preventing ghost light in the light scanning apparatus of an opposed scanning system.

When the laser beam emitted from the light source travels in the light source holder holding the light source, the laser beam may be reflected by a cylindrical surface of the light source holder and travel in an unintended direction. The laser beam travelling in the unintended direction is referred to as ghost light. When the ghost light reaches the surface to be scanned, there is a problem in that an unintended image is formed on the surface to be scanned so that an image defect is caused.

SUMMARY OF THE INVENTION

The present invention has been made in view of the above-mentioned circumstances, and has an object to prevent generation of ghost light.

In order to achieve the above mentioned object, according to one embodiment of the present invention, there is provided a light scanning apparatus, comprising:

a first light source configured to emit a first light beam;

a first holder configured to hold the first light source, the first holder including an inner wall surrounding a space through which the first light beam passes;

a second light source configured to emit a second light beam;

a second holder configured to hold the second light source, the second holder including an inner wall surrounding a space through which the second light beam passes;

a rotary polygon mirror including a plurality of deflecting surfaces and configured to deflect the first light beam and the second light beam by the plurality of deflecting surfaces, wherein a deflecting surface included in the plurality of deflecting surfaces and on which the first light beam is incident is different from a deflecting surface included in the plurality of deflecting surfaces and on which the second light beam is incident;

a housing including a bottom surface on which the rotary polygon mirror is mounted and a side wall portion on which the first light source and the second light source are mounted, the side wall portion standing from the bottom surface; and a wall portion provided between the first light source and the rotary polygon mirror and between the second light source and the rotary polygon mirror and standing from the bottom surface, the wall portion being configured to block the first light beam reflected by the inner wall of the first holder and the second light beam reflected by the inner wall of the second holder.

Further features of the present invention will become apparent from the following description of exemplary embodiments with reference to the attached drawings.

DESCRIPTION OF THE EMBODIMENTS

Now, embodiments of the present invention will be described in detail with reference to the drawings. In the following description, a rotation axis direction of a rotary polygon mirror 42, which is to be described later, is defined as a Z-axis direction. A longitudinal direction of optical members is defined as a Y-axis direction. A direction orthogonal to the Y axis and the Z axis is defined as an X-axis direction. Further, a rotating direction of the rotary polygon mirror 42 is defined as a main scanning direction, and a direction orthogonal to the main scanning direction is defined as a sub-scanning direction. In this case, the main scanning direction may be parallel to the Y axis or the X axis, and the sub-scanning direction may be parallel to the Z axis.

Embodiments

[Configuration of Image Forming Apparatus]

Figure 1:
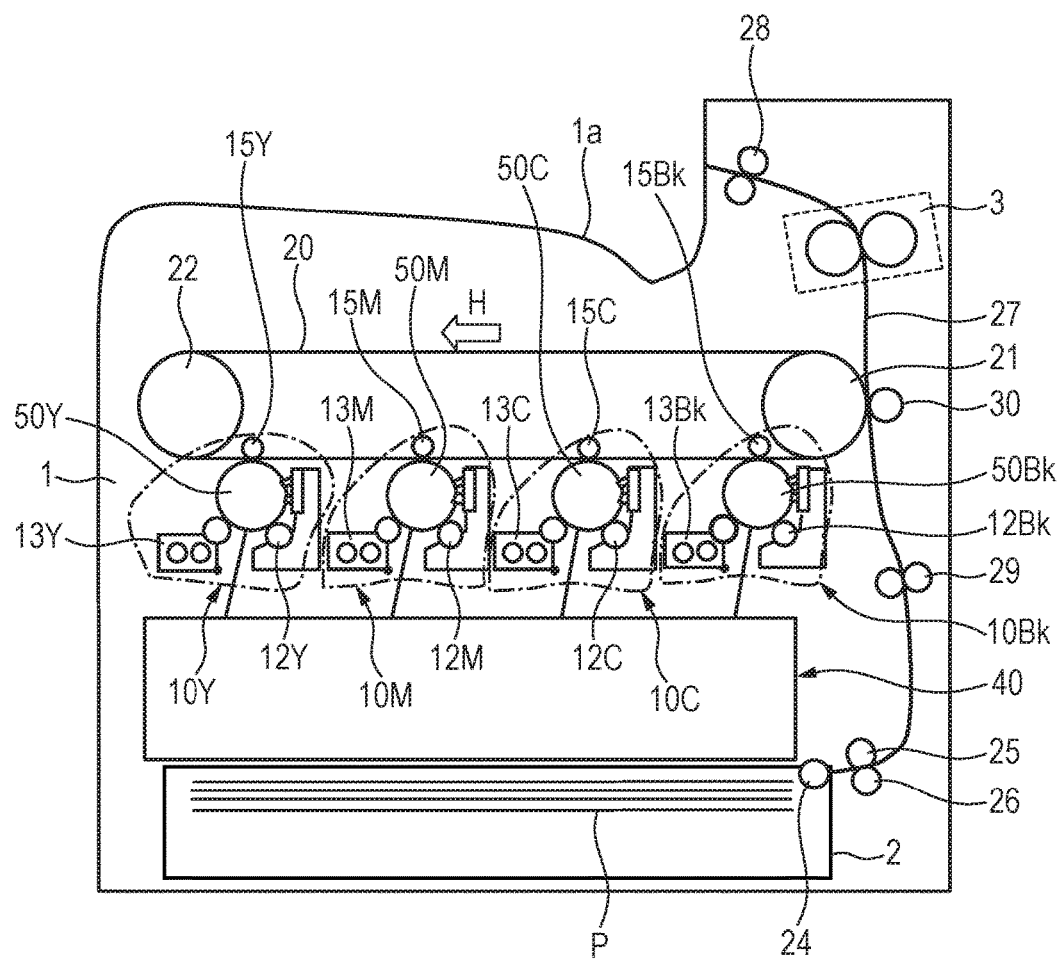
FIG. 1 is a schematic view for illustrating an image forming apparatus according to an embodiment of the present invention.

A configuration of an image forming apparatus according to an embodiment of the present invention will be described. FIG. 1 is a schematic view for illustrating an overall configuration of a tandem type color laser beam printer of this embodiment. The laser beam printer (hereinafter simply referred to as "printer") includes four image forming engines 10Y, 10M, 10C, and 10Bk (indicated by the dashed-dotted lines) configured to form toner images for respective colors of yellow (Y), magenta (M), cyan (C), and black (Bk). Further, the printer includes an intermediate transfer belt 20 being a transfer-receiving member onto which a toner image is transferred from each of the image forming engines 10Y, 10M, 10C, and 10Bk. Then, the toner images multiply transferred onto the intermediate transfer belt 20 are transferred onto a recording sheet P being a recording medium to form a full-color image. Unless otherwise necessary, the reference symbols Y, M, C, and Bk indicating the respective colors are hereinafter omitted.

The intermediate transfer belt 20 is formed into an endless shape and is carried over a pair of belt conveyance rollers 21 and 22 so that a toner image formed by each image forming engine 10 is transferred while the intermediate transfer belt 20 is rotating in a direction indicated by the arrow H. Further, a secondary transfer roller 30 is provided at a position opposed to one belt conveyance roller 21 across the intermediate transfer belt 20. The recording sheet P is inserted between the secondary transfer roller 30 and the intermediate transfer belt 20 which are held in press-contact with each other, with the result that a toner image is transferred onto the recording sheet P from the intermediate transfer belt 20. The four image forming engines 10Y, 10M, 10C, and 10Bk described above are arranged in parallel on a lower side of the intermediate transfer belt 20 so that a toner image formed in accordance with image information of each color is transferred onto the intermediate transfer belt 20 (hereinafter referred to as "primary transfer"). The four image forming engines 10 are arranged in the following order: the image forming engine 10Y for yellow, the image forming engine 10M for magenta, the image forming engine 10C for cyan, and the image forming engine 10Bk for black along a rotation direction (direction indicated by the arrow H) of the intermediate transfer belt 20.

Further, a light scanning apparatus 40 configured to expose a photosensitive drum 50 being a photosensitive member provided in each image forming engine 10 to light in accordance with image information is provided below the image forming engines 10. Photosensitive drums 50Y, 50M, 50C, and 50Bk function as a third photosensitive member, a first photosensitive member, a fourth photosensitive member, and a second photosensitive member, respectively. The detailed illustration and description of the light scanning apparatus 40 are omitted in FIG. 1 and described later with reference to FIG. 2, FIG. 3A, and FIG. 3B. The light scanning apparatus 40 is shared by all the image forming engines 10Y, 10M, 10C, and 10Bk and includes four semiconductor lasers (not shown) configured to emit a laser beam modulated in accordance with image information of each color. Further, the light scanning apparatus 40 includes a deflection device. The deflection device includes the rotary polygon mirror 42 and a scanner motor 41. The rotary polygon mirror 42 is configured to rotate at high speed to deflect each laser beam so that the laser beams of four optical paths scan the photosensitive drums 50 in a rotation axis direction (Y-axis direction). The scanner motor 41 is configured to rotate the rotary polygon mirror 42 (see FIG. 2). The deflection device includes the rotary polygon mirror 42, the scanner motor 41 being a drive unit configured to cause the rotary polygon mirror 42 to rotate, and a board on which the scanner motor 41 is mounted. Each laser beam scanned by the rotary polygon mirror 42 travels through a predetermined path while being guided by the optical members provided in the light scanning apparatus 40. Then, each laser beam which has travelled through the predetermined path exposes each photosensitive drum 50 of each image forming engine 10 to light through each irradiation port (not shown) formed in an upper portion of the light scanning apparatus 40.

Further, each image forming engine 10 includes the photosensitive drum 50 and a charging roller 12 configured to charge the photosensitive drum 50 to a uniform background potential. Further, each image forming engine 10 includes a developing device 13 configured to form a toner image by developing an electrostatic latent image formed on the photosensitive drum 50 (photosensitive member) by exposure to the laser beam. The developing device 13 forms a toner image in accordance with image information of each color on the photosensitive drum 50 being a photosensitive member. Developing devices 13Y, 13M, 13C, and 13Bk function as a third developing device, a first developing device, a fourth developing device, and a second developing device, respectively.

A primary transfer roller 15 is provided at a position opposed to the photosensitive drum 50 of each image forming engine 10 across the intermediate transfer belt 20. When a predetermined transfer voltage is applied to the primary transfer roller 15, a toner image on the photosensitive drum 50 is transferred onto the intermediate transfer belt 20. Primary transfer rollers 15Y, 15M, 15C, and 15Bk function as a third transfer member, a first transfer member, a fourth transfer member, and a second transfer member, respectively.

Meanwhile, the recording sheet P is supplied from a feed cassette 2 housed in a lower portion of a printer housing 1 to an inner portion of the printer, specifically a secondary transfer position at which the intermediate transfer belt 20 and the secondary transfer roller 30 are held in abutment against each other. In an upper portion of the feed cassette 2, a pickup roller 24 configured to pull out the recording sheet P received in the feed cassette 2 and a feed roller 25 are arranged in parallel. Further, a retard roller 26 configured to prevent overlap feeding of the recording sheet P is provided at a position opposed to the feed roller 25. A conveyance path 27 of the recording sheet P inside the printer is provided substantially vertically along a right side surface of the printer housing 1. The recording sheet P pulled out from the feed cassette 2 positioned in a bottom portion of the printer housing 1 ascends through the conveyance path 27 and is sent to registration rollers 29 configured to control an entry timing of the recording sheet P with respect to the secondary transfer position. After that, a toner image is transferred onto the recording sheet P at the secondary transfer position, and then the recording sheet P is sent to a fixing device 3 (indicated by the broken lines) provided on a downstream side in the conveyance direction. Then, the recording sheet P having the toner image fixed thereon by the fixing device 3 is delivered by delivery rollers 28 to a delivery tray 1a provided in an upper portion of the printer housing 1. When a full-color image is formed by the color laser beam printer configured as described above, first, the light scanning apparatus 40 exposes the photosensitive drum 50 of each image forming engine 10 to light at a predetermined timing in accordance with image information of each color.

[Light Scanning Apparatus]

Figure 2:
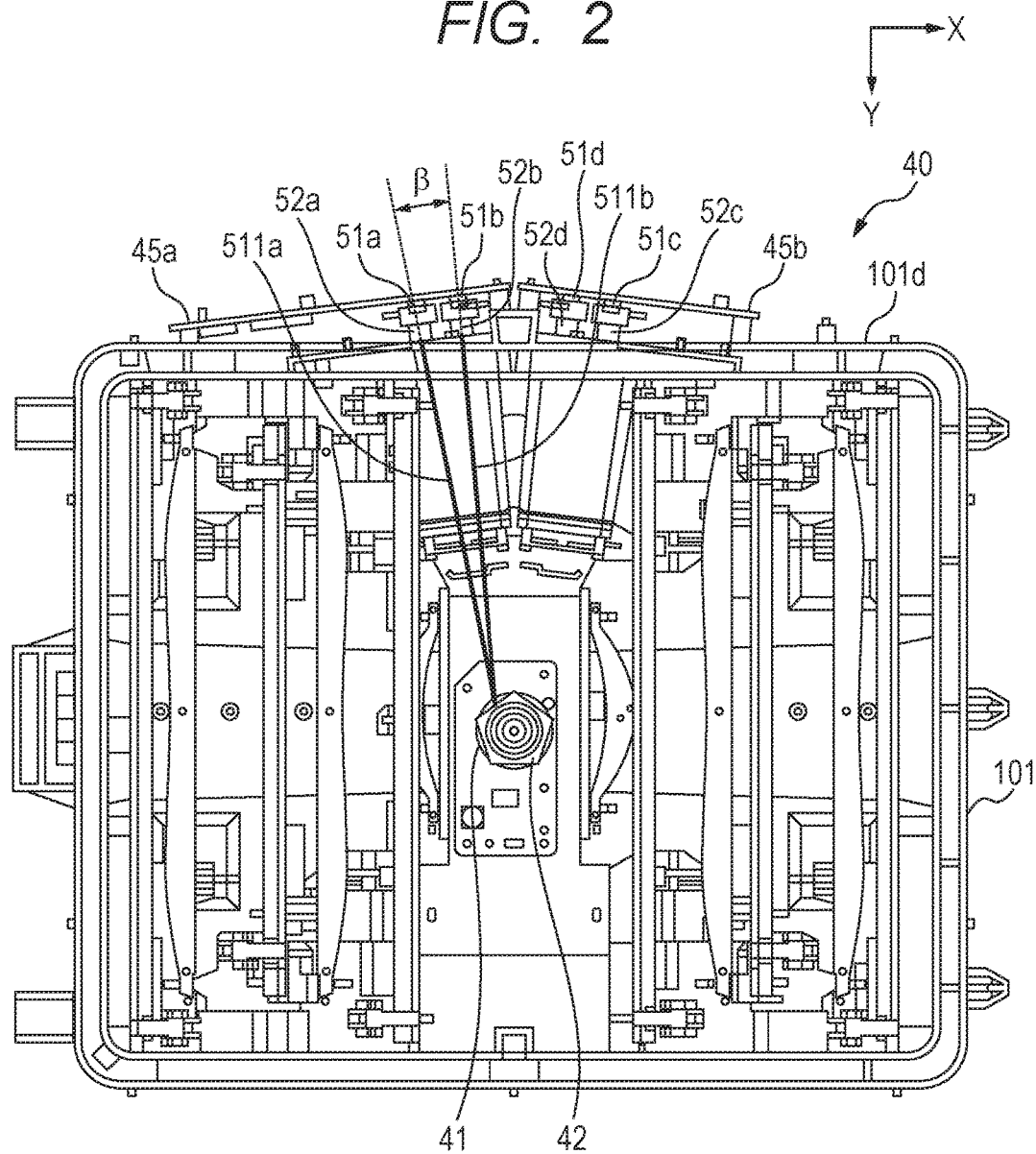
FIG. 2 is a schematic view for illustrating a light scanning apparatus according to the embodiment when seen from above.

FIG. 2 is a view for illustrating the light scanning apparatus 40 when seen from above, and is an illustration of a state in which an upper lid 69 (see FIG. 3A) of the light scanning apparatus 40 is removed so that the rotary polygon mirror 42, optical components, and the like can be seen. For example, in this embodiment, one light source is provided for one image forming engine 10. Specifically, a light source 51a being a third light source corresponds to the image forming engine 10Y, and a light source 51b being a first light source corresponds to the image forming engine 10M. The light source 51a is configured to emit a laser beam so that the laser beam (third light beam) emitted from the light source 51a is reflected by the rotary polygon mirror 42 in the same direction as a traveling direction of a laser beam (first light beam) emitted from the light source 51b and reflected by the rotary polygon mirror 42. A light source 51c being a fourth light source corresponds to the image forming engine 10C, and a light source 51d being a second light source corresponds to the image forming engine 10Bk. The light source 51d is configured to emit a laser beam (second light beam) so that the laser beam emitted from the light source 51d is reflected by the rotary polygon mirror 42 in a direction opposite to a traveling direction of the laser beam emitted from the light source 51b and reflected by the rotary polygon mirror 42. The light source 51c is configured to emit a laser beam so that the laser beam (forth light beam) emitted from the light source 51c is reflected by the rotary polygon mirror 42 in the same direction as a traveling direction of the laser beam emitted from the light source 51d and reflected by the rotary polygon mirror 42.

The light source 51a is held by a light source holder 52a being a third holder. The light source 51b is held by a light source holder 52b being a first holder. The light source 51c is held by a light source holder 52c being a fourth holder. The light source 51d is held by a light source holder 52d being a second holder. The light source holders 52a to 52d each have a cylindrical shape. In the following description, unless otherwise necessary, description of additional reference symbols "a" to "d" is omitted.

The light sources 51 are mounted to a circuit board together with a laser driver (not shown) configured to drive the light sources 51. The circuit board is fixed to a side wall portion 101d extending upright from a bottom surface 101c of a housing 101. Specifically, the two light sources 51a and 51b are mounted to a circuit board 45a, and the two light sources 51c and 51d are mounted to a circuit board 45b. The light sources 51a and 51b are mounted to the circuit board 45a so that optical paths of the laser beams emitted from the light sources 51a and 51b are different from each other in angle in the main scanning direction and the sub-scanning direction. The laser beam emitted from the light source 51a is referred to as a laser beam 511a. The laser beam emitted from the light source 51b is referred to as a laser beam 511b. The light source 51b and the light source 51a are arranged so that the laser beam 511b and the laser beam 511a form an angle β being a predetermined angle. Herein, a laser beam that is emitted from the light source 51b and travels toward the rotary polygon mirror 42 without being reflected by an inner wall of the light source holder 52b is referred to as a first beam. A laser beam that is emitted from the light source 51a and travels toward the rotary polygon mirror 42 without being reflected by an inner wall of the light source holder 52a is referred to as a third beam. The light source 51b and the light source 51a are arranged so that an optical path of the first beam and an optical path of the third beam form the angle β being the predetermined angle.

The same holds true for the light source 51d and the light source 51c. Herein, a laser beam that is emitted from the light source 51d and travels toward the rotary polygon mirror 42 without being reflected by an inner wall of the light source holder 52d is referred to as a second beam. A laser beam that is emitted from the light source 51c and travels toward the rotary polygon mirror 42 without being reflected by an inner wall of the light source holder 52c is referred to as a fourth beam. The light source 51d and the light source 51c are arranged so that an optical path of the second beam and an optical path of the fourth beam form the angle β being the predetermined angle. The two circuit boards 45a and 45b are fixed to the side wall portion 101d of the housing 101.

Of the light source 51a and the light source 51b, the light source 51b is arranged at a position closer to the rotary polygon mirror 42 in the main scanning direction than the light source 51a. Of the light source 51c and the light source 51d, the light source 51d is arranged at a position closer to the rotary polygon mirror 42 in the main scanning direction than the light source 51c. That is, the light sources 51a and 51c are arranged on sides (outer sides) farther from the rotary polygon mirror 42 in the main scanning direction than the light sources 51b and 51d. The laser beam emitted from the light source 51b is larger in angle of incidence on the rotary polygon mirror 42 in the main scanning direction than the laser beam emitted from the light source 51a. The laser beam emitted from the light source 51d is larger in angle of incidence on the rotary polygon mirror 42 in the main scanning direction than the laser beam emitted from the light source 51c. The housing 101 is formed of a resin, and is manufactured by injection molding.

[Optical Paths of Laser Beams]

Figure 3A:
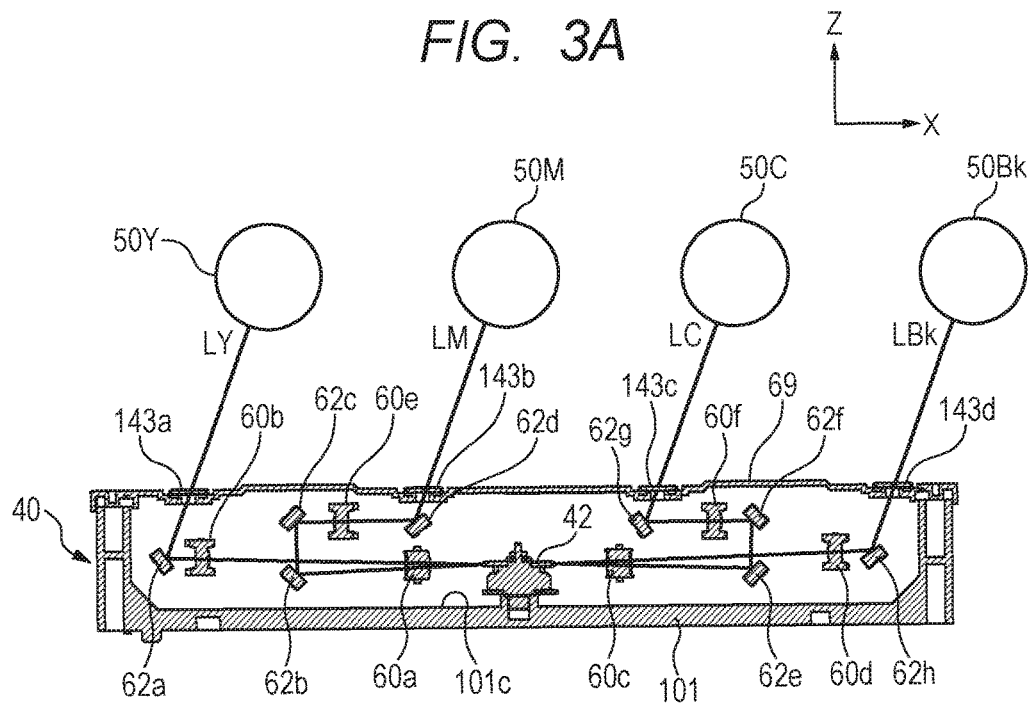
FIG. 3A is a sectional view for illustrating the light scanning apparatus according to the embodiment.

FIG. 3A is an explanatory view for illustrating optical paths of laser beams in the light scanning apparatus 40, and is a schematic sectional view for illustrating an overall image of the light scanning apparatus 40 to which the optical components are mounted. The light scanning apparatus 40 includes optical lenses 60a to 60f configured to guide each laser beam onto the photosensitive drum 50 to image the laser beam, and reflection mirrors 62a to 62h being the optical components. The rotary polygon mirror 42 and the reflection mirrors 62a to 62h are housed inside the housing 101. With reference to FIG. 3A, description is made of how each laser beam is guided onto the photosensitive drum 50 by the optical lenses 60a to 60f and the reflection mirrors 62a to 62h. A laser beam LY, which is emitted from the light source 51a to correspond to the photosensitive drum 50Y, is deflected by the rotary polygon mirror 42 and enters the optical lens 60a. The laser beam LY passes through the optical lens 60a, and enters the optical lens 60b. After passing through the optical lens 60b, the laser beam LY is reflected by the reflection mirror 62a. The laser beam LY reflected by the reflection mirror 62a passes through a transparent window 143a, and scans the photosensitive drum 50Y.

A laser beam LM, which is emitted from the light source 51b to correspond to the photosensitive drum 50M, is deflected by the rotary polygon mirror 42 and enters the optical lens 60a. The laser beam LM passes through the optical lens 60a, is reflected by the reflection mirror 62b and the reflection mirror 62c, and enters the optical lens 60e. After passing through the optical lens 60e, the laser beam LM is reflected by the reflection mirror 62d. The laser beam LM reflected by the reflection mirror 62d passes through a transparent window 143b, and scans the photosensitive drum 50M.

A laser beam LC, which is emitted from the light source 51c to correspond to the photosensitive drum 50C, is deflected by the rotary polygon mirror 42, and enters the optical lens 60c. The laser beam LC passes through the optical lens 60c, is reflected by the reflection mirror 62e and the reflection mirror 62f, and enters the optical lens 60f. The laser beam LC passes through the optical lens 60f, and is reflected by the reflection mirror 62g. The laser beam LC reflected by the reflection mirror 62g passes through a transparent window 143c, and scans the photosensitive drum 50c.

A laser beam LBk, which is emitted from the light source 51d to correspond to the photosensitive drum 50Bk, is deflected by the rotary polygon mirror 42 and enters the optical lens 60c. The laser beam LBk passes through the optical lens 60c, and enters the optical lens 60d. After passing through the optical lens 60d, the laser beam LBk is reflected by the reflection mirror 62h. The laser beam LBk reflected by the reflection mirror 62h passes through a transparent window 143d, and scans the photosensitive drum 50Bk.

[Main Scanning Apertures and Light Blocking Portions for Ghost Light]

Figure 3B:
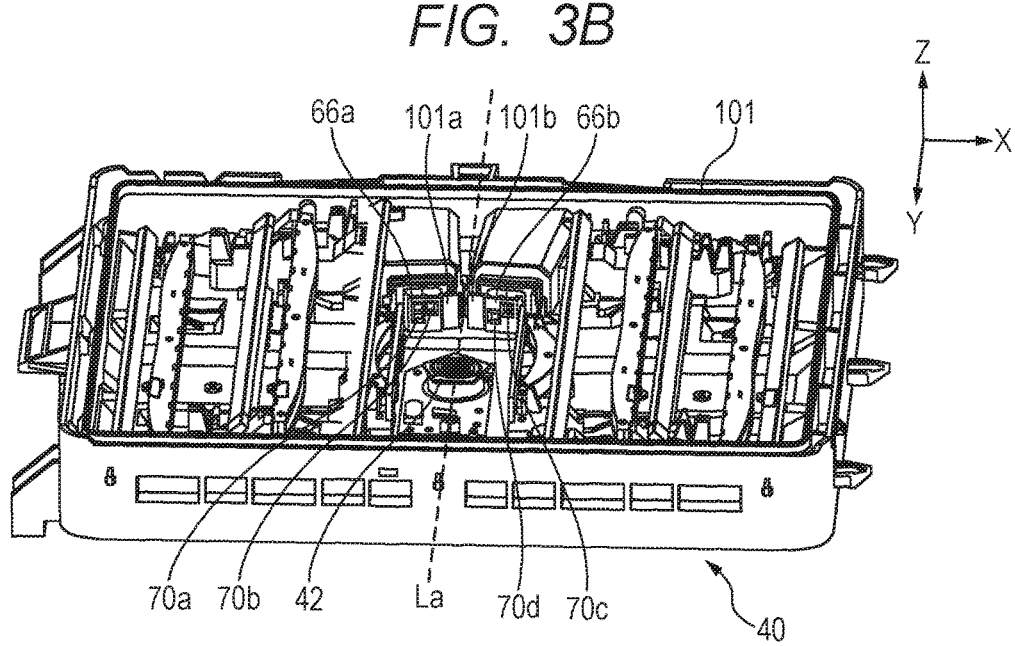
FIG. 3B is a perspective view for illustrating the light scanning apparatus.

FIG. 3B is a perspective view for illustrating the light scanning apparatus 40 of FIG. 2 when seen from an obliquely upper side thereof in a plus Y-axis direction. A main scanning aperture 66a and a main scanning aperture 66b are formed in the housing 101 of the light scanning apparatus 40. The main scanning aperture 66a is a first aperture portion configured to adjust light amounts of the laser beams emitted from the light sources 51, and the main scanning aperture 66b is a second aperture portion. The main scanning aperture 66a has an opening 70a being a third opening, and an opening 70b being a first opening. The main scanning aperture 66b has an opening 70c being a fourth opening, and an opening 70d being a second opening.

The laser beam emitted from the light source 51a is regulated by the opening 70a of the main scanning aperture 66a to become a beam having a predetermined width. The laser beam emitted from the light source 51b is regulated by the opening 70b of the main scanning aperture 66a to become a beam having a predetermined width. The laser beam emitted from the light source 51c is regulated by the opening 70c of the main scanning aperture 66b to become a beam having a predetermined width. The laser beam emitted from the light source 51d is regulated by the opening 70d of the main scanning aperture 66b to become a beam having a predetermined width. In order to reduce an influence of surface eccentricity of the rotary polygon mirror 42, each of the main scanning apertures 66a and 66b is arranged between the light sources 51 and the rotary polygon mirror 42 at a position close to the rotary polygon mirror 42.

Further, light blocking portions 101a and 101b are provided in the housing 101. The light blocking portions 101a and 101b are configured to block ghost light, which is to be described later, so as to prevent the ghost light from traveling to a side opposite to an originally-designed traveling side of the laser beam emitted from each light source 51. The main scanning aperture 66a having the openings 70a and 70b is formed integrally with the light blocking portion 101a that is configured to block the ghost light and is a first wall portion. The main scanning aperture 66b having the openings 70c and 70d is formed integrally with the light blocking portion 101b that is configured to block the ghost light and is a second wall portion. Accordingly, the light blocking portions 101a and 101b, which are the wall portions to block the ghost light, are arranged between the light sources 51 and the rotary polygon mirror 42, and extend upright from the bottom surface 101c of the housing 101. That is, the light blocking portions 101a and 101b are molded integrally with the housing 101. The light blocking portions 101a and 101b may be members that are to be mounted to the housing 101 after molding.

The light blocking portion 101a blocks the laser beam emitted from the light source 51b and reflected by the inner wall of the light source holder 52b, or the laser beam emitted from the light source 51a and reflected by the inner wall of the light source holder 52a. The light blocking portion 101b blocks the laser beam emitted from the light source 51d and reflected by the inner wall of the light source holder 52d, or the laser beam emitted from the light source 51c and reflected by the inner wall of the light source holder 52c.

Four light sources 51, namely, the four light sources 51a to 51d are arranged in total. Two sets each including two light sources 51 are arranged symmetrically with respect to a line La that passes through a rotation axis of the rotary polygon mirror 42 and is parallel to the Y axis. One set, which includes the main scanning aperture 66a having the two openings 70a and 70b and the light blocking portion 101a for the ghost light, and another set, which includes the main scanning aperture 66b having the two openings 70c and 70d and the light blocking portion 101b for the ghost light, are arranged symmetrically with respect to the line La.

[Light Source Units]

Figure 4:
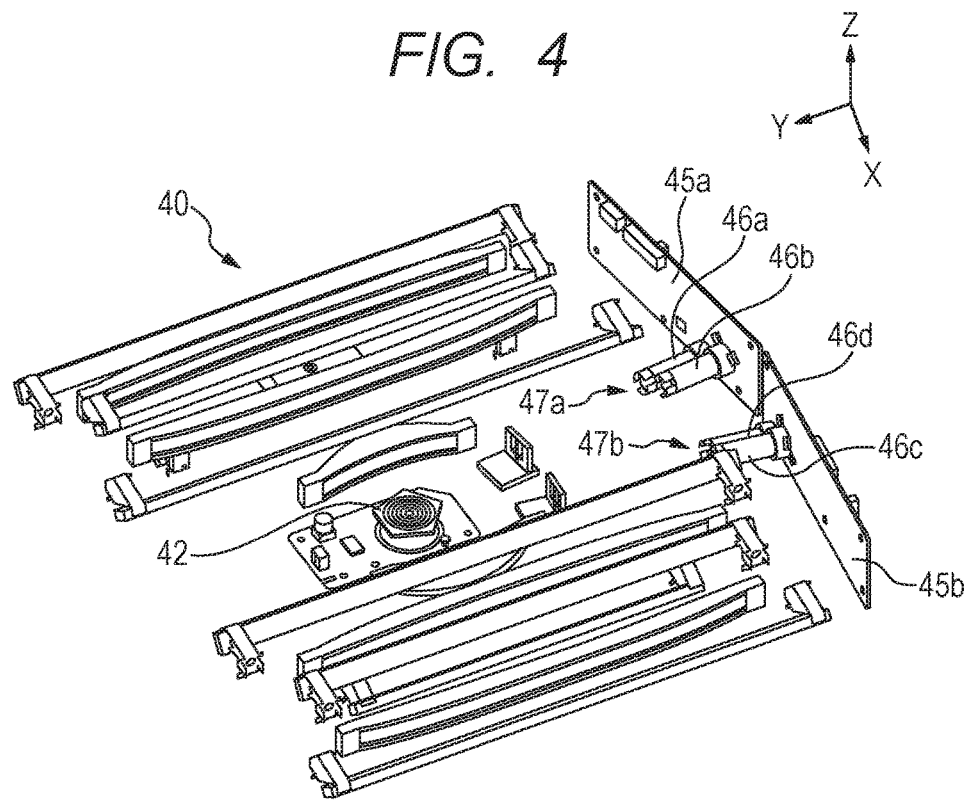
FIG. 4 is a perspective view for illustrating main components of the light scanning apparatus according to the embodiment.

FIG. 4 is a schematic view for illustrating main components of the light scanning apparatus 40. In FIG. 4, illustrations of the housing 101 and the like are omitted. Light source units 47 are arranged on the side wall portion 101d of the light scanning apparatus 40. In each of the light source units 47, the light sources 51 configured to emit the laser beams are installed. The rotary polygon mirror 42 configured to reflect and deflect each laser beam, the optical lenses 60, the reflection mirrors 62, and the like are installed inside the light scanning apparatus 40. The optical lenses 60 and the reflection mirrors 62 are required to guide each laser beam onto a surface to be scanned to form an image. In FIG.

4, some reference symbols are omitted, and the same holds true for the subsequent drawings.

The laser beam deflected and scanned by the rotary polygon mirror 42 passes through the optical lens 60a or the optical lens 60c having a strong power in the main scanning direction, and is then guided to the optical lens 60b, the optical lens 60d, the optical lens 60e, or the optical lens 60f having a strong optical power in the sub-scanning direction (see FIG. 3A). After that, the laser beam reflected at least once by the reflection mirror 62 is guided onto the photosensitive drum 50 being a member to be scanned, and forms an image on a surface of the photosensitive drum 50 being a surface to be scanned.

Two light source units 47a and 47b are provided on the side wall portion 101d of the housing 101. Specifically, the light source unit 47a includes the light source 51a (first light source) for the photosensitive drum 50Y and the light source 51b for the photosensitive drum 50M, and the light source unit 47b includes the light source 51c for the photosensitive drum 50C and the light source 51d for the photosensitive drum 50Bk. In the following, unless otherwise necessary, description of additional reference symbols "a" and "b" is omitted. The two light source units 47 are arranged symmetrically with respect to a plane that passes through the rotation axis of the rotary polygon mirror 42 and is parallel to a YZ plane. One light source 51 has a plurality of light emission points, for example, eight (or four) light emission points, and eight (or four) laser beams are emitted from one light source. Accordingly, a size of the light source 51 is larger than a size of a light source having, for example, one light emission point. Even when the number of laser beams to be emitted is increased, each of the light emission points of the laser beams can be set to a small size of 1 mm or less. However, a component constructing an electrical connection portion configured to drive the plurality of light emission points is increased in size. As a result, the light source having the plurality of light emission points is increased in package size.

[Arrangement of Light Sources]

Figure 5:
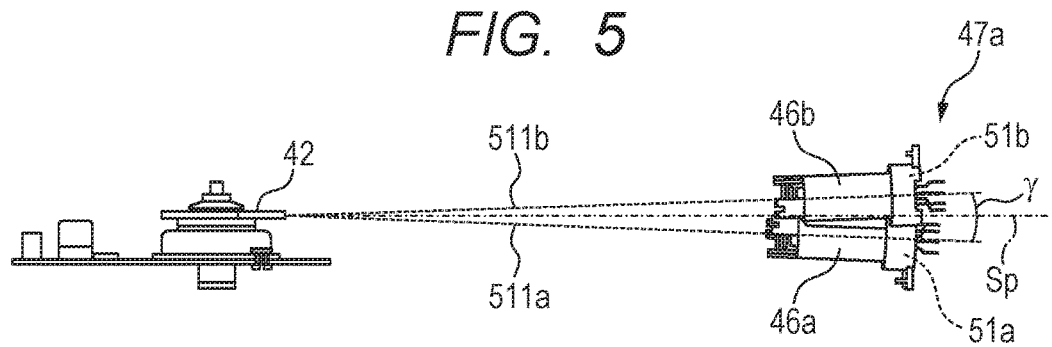
FIG. 5 is a view for illustrating an angle γ formed in a sub-scanning direction between light sources in the embodiment.

FIG. 5 is a schematic view for illustrating chip holders 46a and 46b installed in the same light source unit 47a, and the rotary polygon mirror 42 when seen from the X-axis direction shown in FIG. 4. The light source unit 47a includes the two chip holders 46a and 46b. The chip holder 46a includes the light source 51a, and the chip holder 46b includes the light source 51b. The Chip holder 46a includes an inner wall surrounding a space through which the light beam emitted from the light source 51a passes. The Chip holder 46b includes an inner wall surrounding a space through which the light beam emitted from the light source 51b passes. The light source unit 47a will be described later in detail. In order to downsize the light scanning apparatus 40, the four laser beams emitted from the four light sources 51 are deflected by one rotary polygon mirror 42. The laser beam emitted from the light source 51a or the light source 51b, and the laser beam emitted from the light source 51c or the light source 51d are scanned in opposite directions with respect to the plane that passes through the rotation axis of the rotary polygon mirror 42 and is parallel to the YZ plane. The laser beams emitted from the light source 51a and the light source 51b are scanned by the rotary polygon mirror 42 in the same direction. A virtual plane that is orthogonal to the rotation axis of the rotary polygon mirror and passes through reflection surfaces of the rotary polygon mirror 42 is defined as a virtual plane Sp (indicated by the dashed-dotted line). For example, the light source 51a is arranged so that the laser beam emitted from the light source 51a enters the reflection surface of the rotary polygon mirror 42 from a lower side of the virtual plane Sp. Further, for example, the light source 51b is arranged so that the laser beam emitted from the light source 51b enters the reflection surface of the rotary polygon mirror 42 from an upper side of the virtual plane Sp. An angle γ being a first angle is formed between an optical path of the laser beam 511a and an optical path of the laser beam 511b in the sub-scanning direction. The light source 51a and the light source 51b are arranged on different sides with respect to the virtual plane Sp that has a normal line corresponding to the rotation axis of the rotary polygon mirror 42 and crosses the plurality of reflection surfaces.

The chip holder 46a being the first holder, and the chip holder 46b being the second holder are mounted at positions different from each other in the rotation axis direction of the rotary polygon mirror 42. The chip holder 46a is arranged on a side closer to the bottom surface 101c of the housing 101 than the chip holder 46b. The chip holders 46a and 46b are mounted to the housing 101 so that an incident optical path of the laser beam emitted from the light source 51a to enter the rotary polygon mirror 42 is located between the optical lens 60a and an incident optical path of the laser beam emitted from the light source 51b to enter the rotary polygon mirror 42. Further, the chip holder 46a and the chip holder 46b are mounted to the housing 101 so that a mounting position of the chip holder 46a and a mounting position of the chip holder 46b overlap each other in an optical axis direction of the optical lens 60a. With this configuration, the light scanning apparatus 40 can be downsized.

The light source 51a is provided below the virtual plane Sp so as to form an angle γ/2 with respect to the virtual plane Sp in the sub-scanning direction (Z-axis direction). The light source 51b is provided above the virtual plane Sp so as to form the angle γ/2 with respect to the virtual plane Sp in the sub-scanning direction (Z-axis direction). The angle γ/2 is designed to be equal to or smaller than, for example, 3° in order to reduce the influence of surface eccentricity of the rotary polygon mirror 42 while achieving downsizing of the housing 101. That is, for example, the angle γ is designed to be larger than 0° and equal to or smaller than 6°. In this embodiment, the angle γ may be 0°. In this case, the optical path of the laser beam 511a and the optical path of the laser beam 511b are parallel to each other in FIG. 2. Accordingly, it is necessary to use a rotary polygon mirror having reflection surfaces positioned on the optical path of the laser beam 511a and the optical path of the laser beam 511b. Further, it is also necessary to design the optical path of the laser beam deflected by the rotary polygon mirror in accordance with the case where the angle γ is 0°. When the angle γ is 0°, there may be used a rotary polygon mirror having a two-stage configuration of reflection surfaces so that different reflection surfaces are positioned on the optical path of the laser beam 511a and the optical path of the laser beam 511b. Alternatively, there may be used a rotary polygon mirror having such a configuration that the same reflection surface is positioned on the optical path of the laser beam 511a and the optical path of the laser beam 511b.

With regard to the two light sources 51a and 51b installed in the same light source unit 47a, the chip holders 46a and 46b are arranged so as to have the following positional relationship. The chip holder 46a includes the light source 51a configured to emit the laser beam toward the photosensitive drum 50Y that is arranged on an outer side of the light scanning apparatus 40 with respect to the rotary polygon mirror 42. The chip holder 46a is arranged, with respect to the other chip holder 46b, in a direction (minus Z-axis direction shown in FIG. 4) opposite to a direction (plus Z-axis direction shown in FIG. 4) directed from the light scanning apparatus 40 toward the photosensitive drum 50Y.

[Configuration of Light Source Unit]

Figure 6:
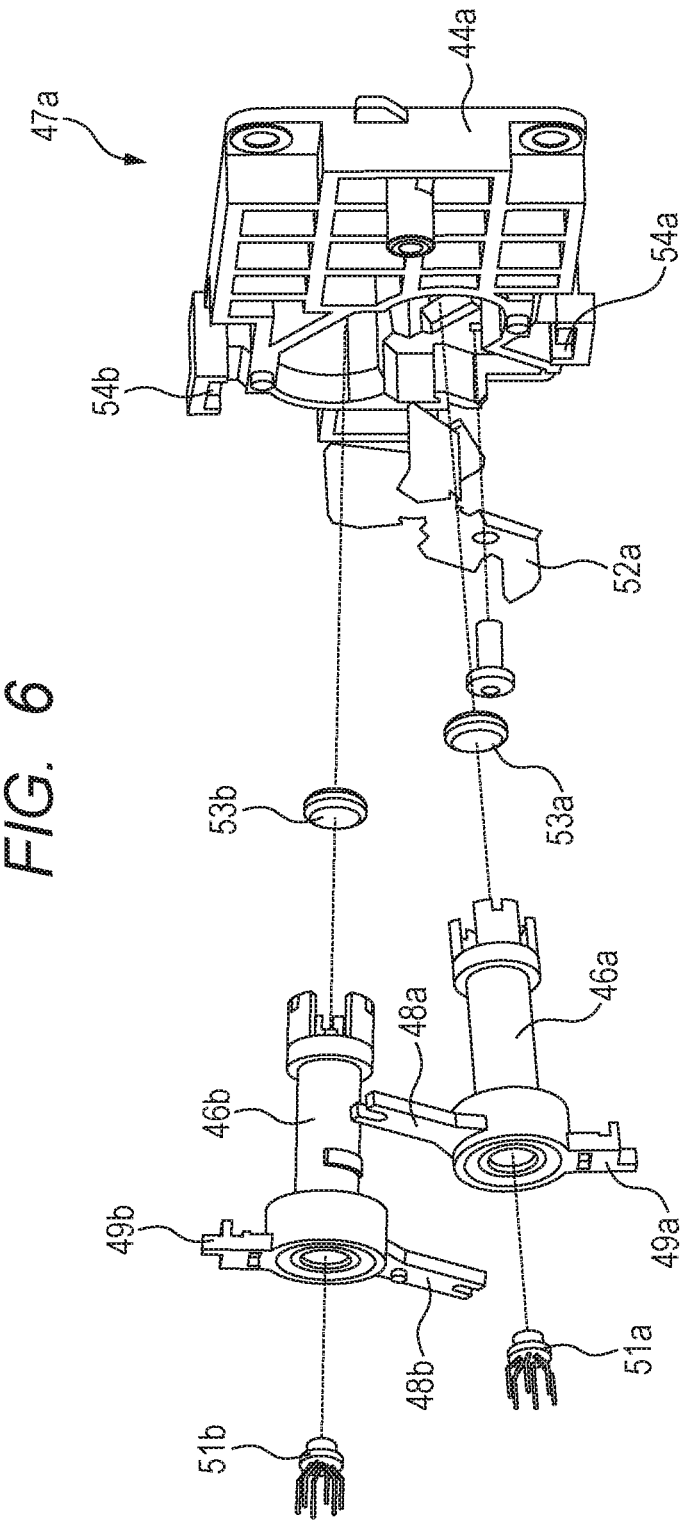
FIG. 6 is an exploded view for illustrating a vicinity of a light source unit when seen from an outer side of a housing according to the embodiment.
Figure 7:
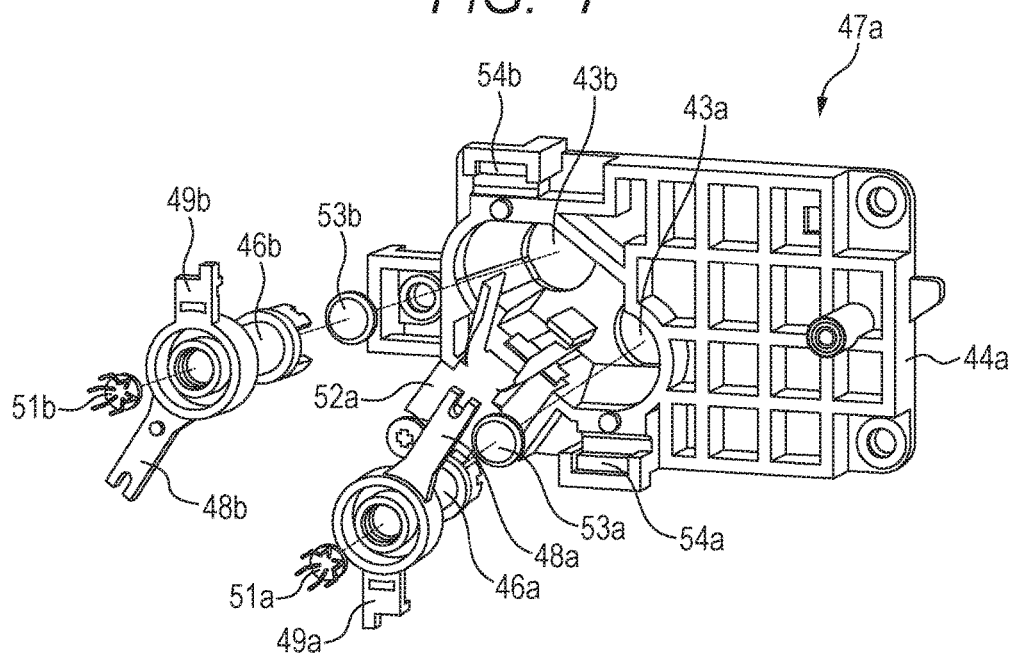
FIG. 7 is an exploded view for illustrating the vicinity of the light source unit when seen from the outer side of the housing according to the embodiment.
Figure 8:
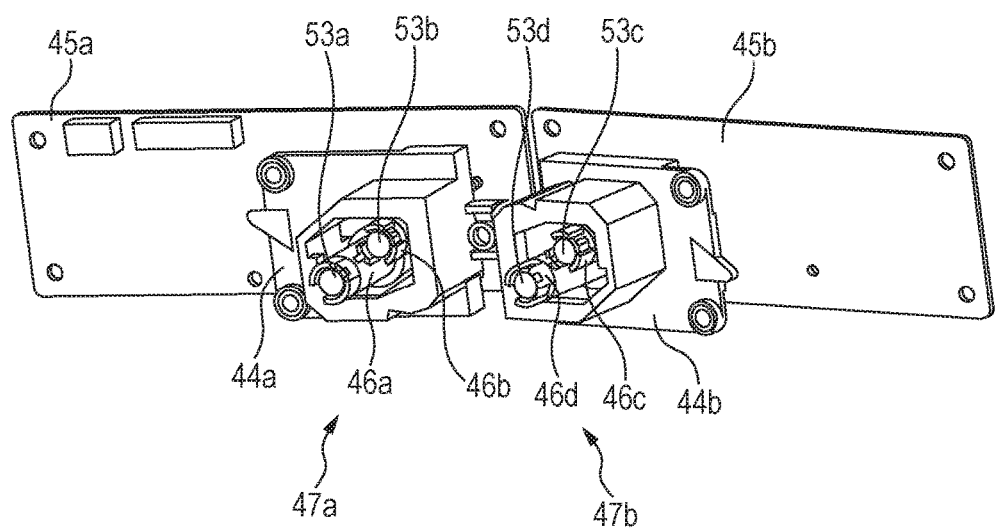
FIG. 8 is a perspective view for illustrating the light source units and circuit boards when seen from a side of a rotary polygon mirror in the embodiment.

FIG. 6 is an exploded perspective view for illustrating a configuration of the light source unit 47a. FIG. 7 is an exploded perspective view for illustrating the light source unit 47a of FIG. 6 when seen from a different angle. FIG. 8 is a perspective view for illustrating a state in which laser holders 44a and 44b are respectively mounted to the circuit boards 45a and 45b when seen from the rotary polygon mirror 42 side. The left side of FIG. 6 corresponds to an outer side of the light scanning apparatus 40, and the right side of FIG. 6 corresponds to the rotary polygon mirror 42 side. Each of the light sources 51a and 51b is a laser chip having, for example, eight (or four) light emission points. The light sources 51a and 51b are respectively press-fitted into the chip holders 46a and 46b formed of a resin. An adjusting protrusion 48a being a first protrusion is formed on the side of the chip holder 46a into which the light source 51a is press-fitted, and an adjusting protrusion 48b being a second protrusion is formed on the side of the chip holder 46b into which the light source 51b is press-fitted. The adjusting protrusions 48a and 48b are protrusions that are to be grasped when the chip holders 46a and 46b are turned. The adjusting protrusions 48a and 48b are used when, for example, in a factory, intervals on the photosensitive drum 50 among scanning positions of the laser beams emitted from the respective light emission points of the light sources 51a and 51b are adjusted in accordance with a resolution of an image. A fixing portion 49a is formed on the side of the chip holder 46a into which the light source 51a is press-fitted, and a fixing portion 49b is formed on the side of the chip holder 46b into which the light source 51b is press-fitted. The fixing portions 49a and 49b are used when the chip holders 46a and 46b are fixed to the laser holder 44a. The laser holder 44a includes receiving portions 54a and 54b. The fixing portion 49a of the chip holder 46a is attached and fixed into the receiving portion 54a of the laser holder 44a. The fixing portion 49b of the chip holder 46b is attached and fixed into the receiving portion 54b of the laser holder 44a. A collimator lens 53a is mounted to an end portion of the chip holder 46a opposite to an end portion thereof into which the light source 51a is press-fitted, and a collimator lens 53b is mounted to an end portion of the chip holder 46b opposite to an end portion thereof into which the light source 51b is press-fitted.

The chip holder 46a including the light source 51a and the collimator lens 53a mounted thereto, and the chip holder 46b including the light source 51b and the collimator lens 53b mounted thereto are fitted to one laser holder 44a. The chip holders 46a and 46b are respectively inserted from a side of the collimator lenses 53a and 53b into openings 43a and 43b formed in the laser holder 44a. A flat spring 52a is inserted between the chip holder 46a and the chip holder 46b fitted to the laser holder 44a. The chip holders 46a and 46b are fixed to the laser holder 44a by an elastic force of the flat spring 52a so as to be immobile in the laser holder 44a. In this embodiment, a configuration of fixing the chip holders 46a and 46b to the laser holder 44a provided separately from the housing 101 is exemplified, but a configuration of directly fixing the chip holders 46a and 46b to the housing 101 may also be adopted. In a case of the configuration of directly fixing the chip holders 46a and 46b to the housing 101, the structure (portions relating to fixing of the chip holders 46a and 46b) similar to the structure of the laser holder 44a illustrated in FIG. 8 is integrally formed on a side wall of the housing 101.

The laser holder 44a including the two chip holders 46a and 46b fixed thereto is fixed between the housing 101 and the circuit board 45a with screws (not shown) or the like. Lead wires of the light sources 51a and 51b of the chip holders 46a and 46b are electrically connected to the circuit board 45a by soldering. The light sources 51c and 51d, the chip holders 46c and 46d, and the laser holder 44b are fixed in the same manner, and hence description thereof is omitted. However, the chip holder 46c is arranged above the virtual plane Sp (see FIG. 5), and is arranged in a direction farther from the rotary polygon mirror 42 than the chip holder 46d. The chip holder 46d is arranged below the virtual plane Sp, and is arranged at a position closer to the rotary polygon mirror 42 than the chip holder 46c. When seen from the rotary polygon mirror 42 side, the light sources 51a to 51d of this embodiment are arranged at positions corresponding to four angles of a parallelogram.

[Ghost Light]

Figure 9A:
FIG. 9A, FIG. 9B, and FIG. 9C are views for illustrating ghost light in the embodiment.
Figure 9B:
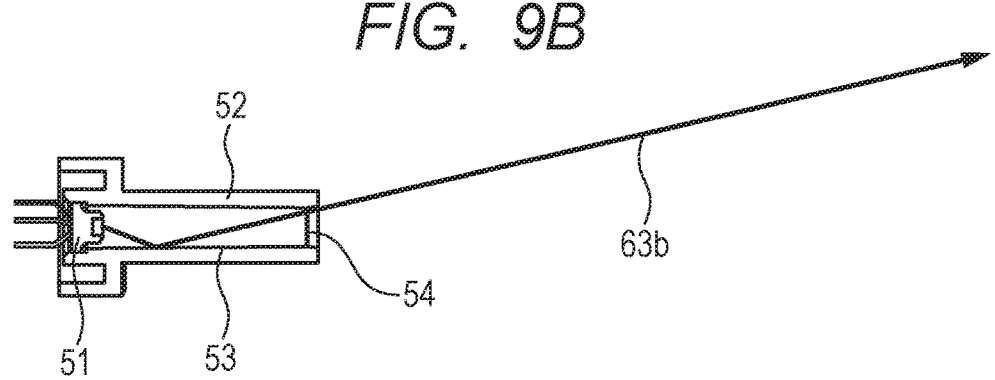
Figure 9C:
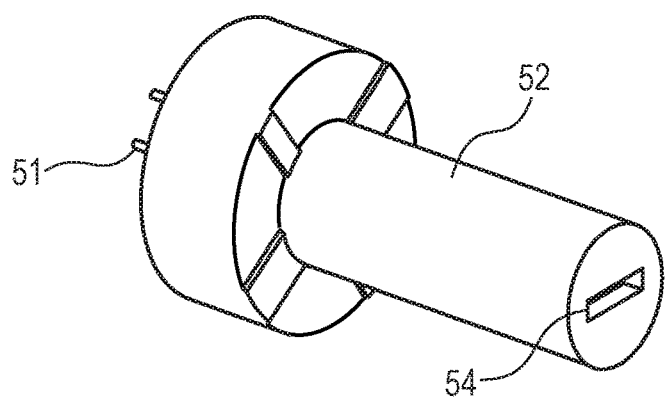

FIG. 9A and FIG. 9B are each a sectional view seen from the plus Z-axis direction, and are each an illustration of the light source 51, the light source holder 52 configured to hold the light source 51, and an optical path of the laser beam emitted from the light source 51. FIG. 9C is a schematic view for illustrating the light source holder 52, and is a perspective view for illustrating a state in which the light source 51 is incorporated into the light source holder 52 when seen from a side opposite to the light source 51. The light source 51 is incorporated in a cylindrical surface 53 being an inner wall surface of the light source holder 52. A sub-scanning aperture 54 configured to adjust the light amount of the laser beam in the sub-scanning direction is formed in the light source holder 52. The sub-scanning aperture 54 is formed into a slit shape having short sides in the sub-scanning direction and long sides in the main scanning direction.

The arrow of FIG. 9A indicates a direction of the laser beam traveling to form a latent image on the surface to be scanned. Hereinafter, the laser beam traveling in this direction is referred to as a laser beam 63a. As illustrated in FIG. 9A, when reaching the surface to be scanned, the laser beam 63a enters the surface to be scanned without being reflected by the cylindrical surface 53 of the light source holder 52. Meanwhile, the arrow of FIG. 9B indicates a traveling direction of the laser beam that is reflected by the cylindrical surface 53 of the light source holder 52 and is then emitted from the light source holder 52 through the sub-scanning aperture 54. Hereinafter, the laser beam traveling in this direction is referred to as a laser beam 63b. Among laser beams emitted from the light source 51, the laser beam 63b thus reaching the surface to be scanned is referred to as the ghost light. When the ghost light is generated, a predetermined latent image cannot be formed on the surface to be scanned, with the result that an image defect is caused. In particular, the laser beam 63b passing through an end portion of the sub-scanning aperture 54 in the main scanning direction is prone to become the ghost light.

Figure 10:
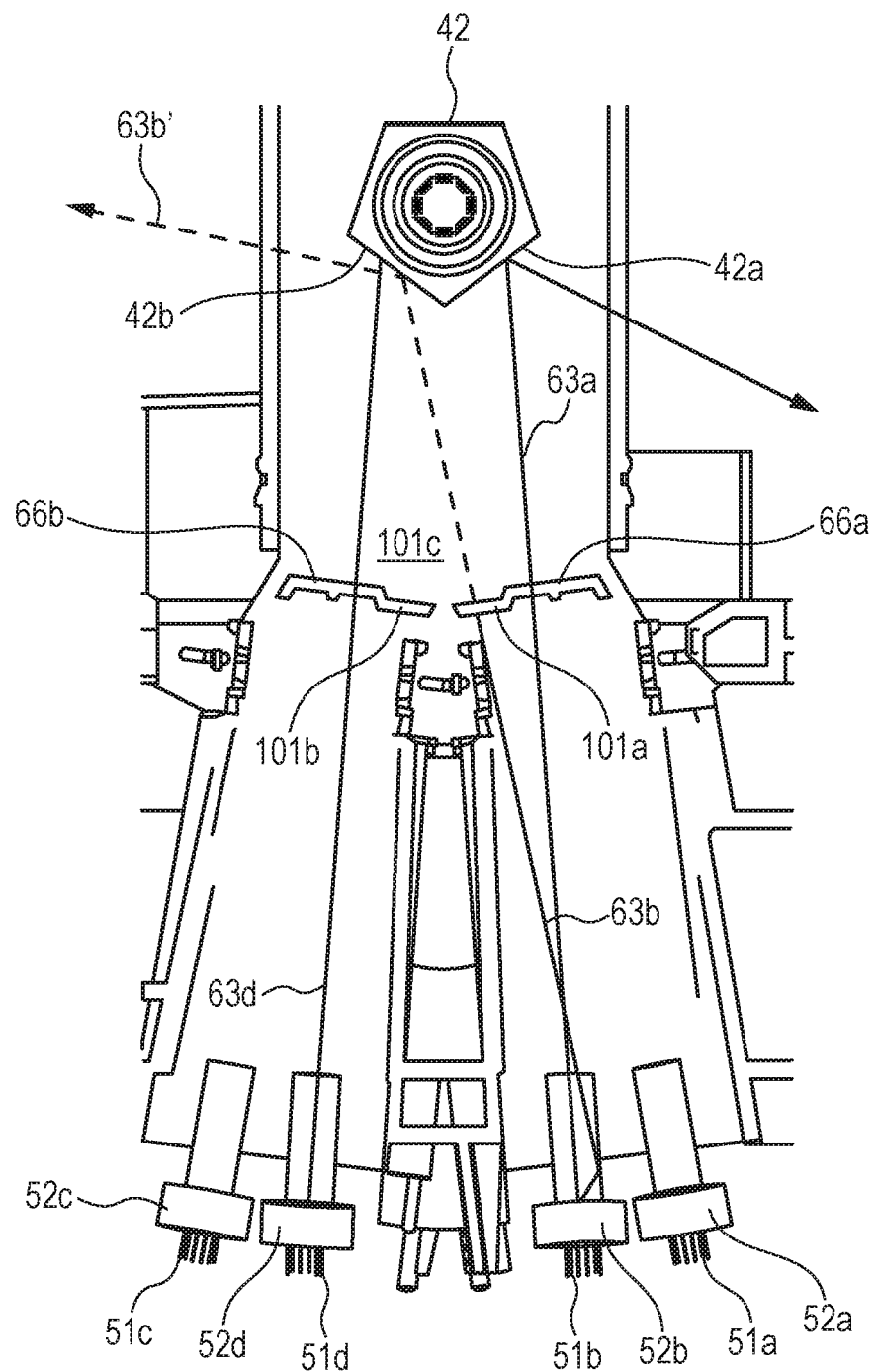
FIG. 10 is a view for illustrating light blocking portions in the embodiment, which are configured to block the ghost light.
Figure 11:
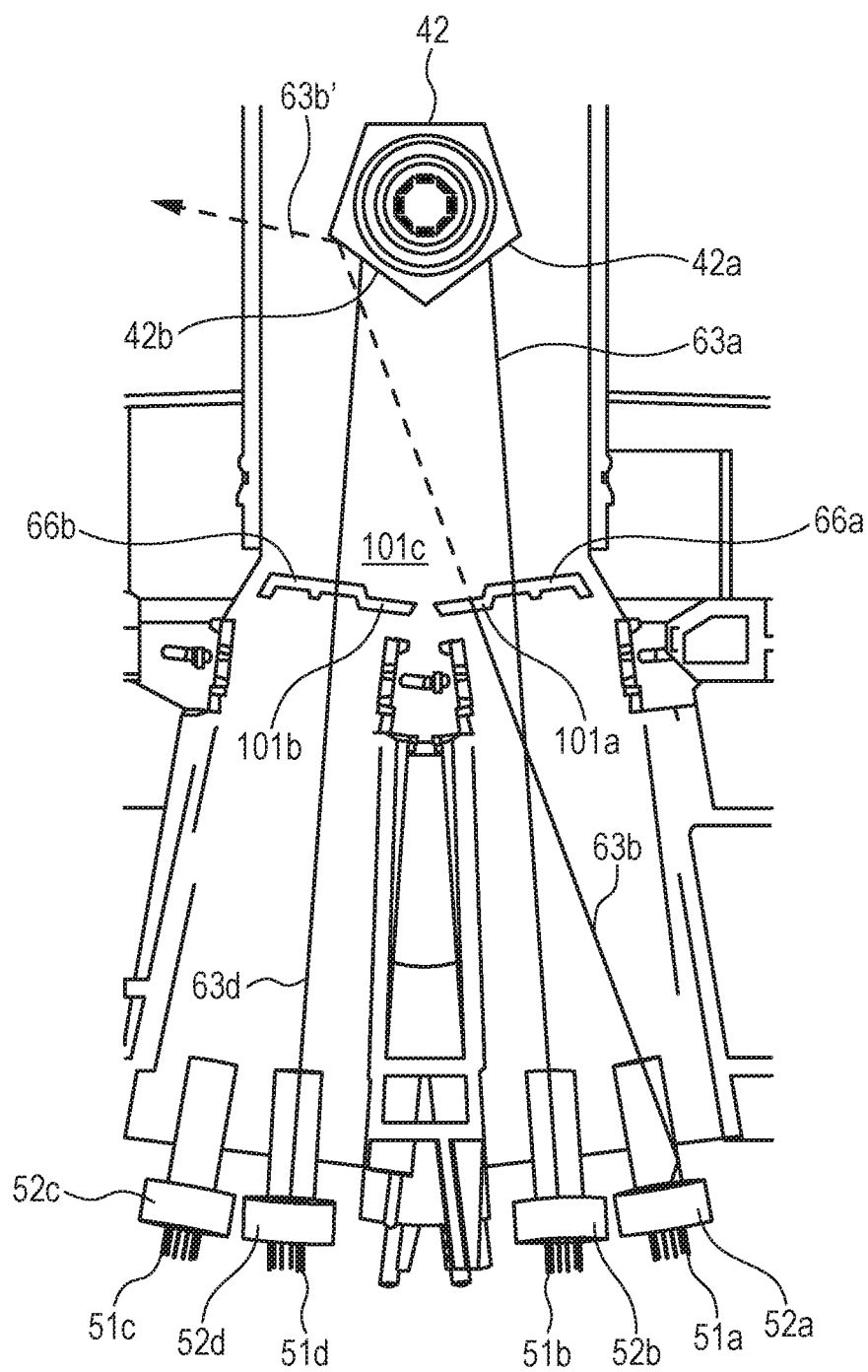
FIG. 11 is a view for illustrating the light blocking portions in the embodiment, which are configured to block the ghost light.

FIG. 10 and FIG. 11 are each a view for illustrating a direction of the laser beam 63b (ghost light) traveling in the light scanning apparatus 40 after being reflected by the cylindrical surface 53 of the light source holder 52 and then passing through the end portion of the sub-scanning aperture 54 in the main scanning direction. FIG. 10 is a view for illustrating a case where the laser beam 63b emitted from the light source 51b is reflected by the cylindrical surface 53 and then passes through the end portion of the sub-scanning aperture 54 in the main scanning direction. FIG. 11 is a view for illustrating a case where the laser beam 63b emitted from the light source 51a is reflected by the cylindrical surface 53 and then passes through the end portion of the sub-scanning aperture 54 in the main scanning direction. The laser beam that is emitted from the light source 51b and travels toward the rotary polygon mirror 42 without being reflected by the inner wall of the light source holder 52b is referred to as the laser beam 63a. A laser beam that is emitted from the light source 51d and travels toward the rotary polygon mirror 42 without being reflected by the inner wall of the light source holder 52d is referred to as a laser beam 63d. The light blocking portions 101a and 101b are provided between the optical path of the laser beam 63a and the optical path of the laser beam 63d.

In FIG. 10 and FIG. 11, the broken line indicates an optical path along which the laser beam 63b being the ghost light travels when the light blocking portion 101a in this embodiment is not formed. The laser beam traveling along this optical path is referred to as a laser beam 63b'. When the light blocking portion 101a is not formed in the housing 101, as illustrated in FIG. 10 and FIG. 11, the laser beam 63b enters a surface 42b of the rotary polygon mirror 42 next to a surface 42a that the laser beam 63a enters without being reflected by the light source holder 52. Thus, the laser beam 63b' travels toward the optical components such as the optical lenses 60 and the reflection mirrors 62 that are arranged on the opposite side across the rotary polygon mirror 42. Then, the laser beam 63b' reaches the surface to be scanned of the photosensitive drum 50, and may, as the ghost light, cause the image defect. When the light source 51a, the light source 51b, the light source 51c, and the light source 51d are turned on simultaneously, the laser beams emitted from the light source 51a and the light source 51b enter the same reflection surface. Further, the laser beams emitted from the light source 51c and the light source 51d enter a reflection surface next to, in the rotating direction of the rotary polygon mirror, the reflection surface that the laser beams emitted from the light source 51a and the light source 51b enter.

Meanwhile, in this embodiment, in both cases illustrated in FIG. 10 and FIG. 11, the laser beam 63b enters the light blocking portion 101a. The laser beam 63b is blocked by the light blocking portion 101a. Accordingly, the laser beam 63b does not reach the surface to be scanned of the photosensitive drum 50, and does not cause the image defect. The same holds true for the light blocking portion 101b. In this embodiment, in order to prevent the laser beam 63b being the ghost light from reaching the photosensitive drum 50 and causing the image defect, the light blocking portions 101a and 101b for the ghost light are formed in the housing 101.

Further, FIG. 10 is an illustration of a case where the laser beam 63b being the ghost light is emitted from the light source 51b among the plurality of light sources 51, which causes the laser beam emitted therefrom to enter the rotary polygon mirror 42 at a larger angle. FIG. 11 is an illustration of a case where the laser beam 63b being the ghost light is emitted from the light source 51a among the plurality of light sources 51, which causes the laser beam emitted therefrom to enter the rotary polygon mirror 42 at a smaller angle. The plurality of light sources 51 are arranged with an angle difference (arranged so as to form the angle $\beta$) in the main scanning direction. In the cases illustrated in FIG. 10 and FIG. 11, as compared to a case where there is no angle difference, a range in which the laser beam 63b may travel toward the rotary polygon mirror 42 becomes wider. Accordingly, in order to prevent the laser beam 63b being the ghost light from traveling toward the rotary polygon mirror 42 and entering the photosensitive drum 50, the following configuration is required. That is, with a configuration in which the main scanning aperture 66a configured to block the laser beam to adjust the light amount is formed integrally with the light blocking portion 101a shaped to block the ghost light, and in which the main scanning aperture 66b configured to block the laser beam to adjust the light amount is formed integrally with the light blocking portion 101b shaped to block the ghost light, it is necessary to prevent passage of the ghost light without allowing the ghost light to pass through a gap.

Meanwhile, description is made of a case where each of the light blocking portions 101a and 101b configured to block the ghost light is not arranged adjacently to each of the main scanning apertures 66a and 66b configured to block the laser beam to adjust the light amount. In this case, each of the light blocking portions 101a and 101b configured to block the ghost light may be arranged between each of the main scanning apertures 66a and 66b and the rotary polygon mirror 42, or arranged between the light sources 51 and the rotary polygon mirror 42.

In the former case, the laser beam 63a and the laser beam 63b being the ghost light intersect with each other. Thus, it is difficult to arrange a component that is shaped to allow only passage of the laser beam 63a for forming an image and block only the laser beam 63b. Further, in the latter case, even when each of the light blocking portions 101a and 101b configured to block the ghost light is arranged closest to the side of the light sources 51 within a range in which each of the light blocking portions 101a and 101b does not block the laser beam 63a, each of the light blocking portions 101a and 101b cannot completely block the laser beam 63b in some cases. Accordingly, it is necessary to separately provide a component that is shaped to block the ghost light after the laser beam 63b being the ghost light is reflected by the rotary polygon mirror 42. This may lead to upsizing of the housing and increase in cost. Therefore, in this embodiment, the light blocking portion 101a configured to block the ghost light is formed integrally with the main scanning aperture 66a, and the light blocking portion 101b configured to block the ghost light is formed integrally with the main scanning aperture 66b.

Here, a direction in which the laser beam emitted from the light source 51b being the first light source is reflected by the rotary polygon mirror 42 is referred to as a first direction. Further, an opposite direction of the first direction, namely, a direction in which the laser beam emitted from the light source 51d, which is the second light source arranged on an opposite side of the first light source with respect to the rotary polygon mirror 42, is reflected by the rotary polygon mirror is referred to as a second direction. It can be said that the light blocking portions 101a and 101b are walls provided between the optical path of the laser beam emitted from the light source 51b being the first light source, and the optical path of the laser beam emitted from the light source 51d being the second light source.

As described above, the main scanning aperture 66a configured to adjust the light amount is formed integrally with the light blocking portion 101a configured to block the ghost light, and the main scanning aperture 66b configured to adjust the light amount is formed integrally with the light blocking portion 101b configured to block the ghost light. When the laser beam that performs exposure is reflected by a freely-selected surface 42a of the rotary polygon mirror 42, the ghost light reflected by the cylindrical surface 53 of the light source holder 52 is prevented from entering the surface 42b next to the surface 42a of the rotary polygon mirror 42. In this manner, the laser beam is prevented from traveling in a direction opposite to the originally-designed traveling direction with respect to the rotary polygon mirror 42, and the ghost light is prevented from reaching the photosensitive drum 50 and causing the image defect. Further, this leads to downsizing of the housing and reduction in cost. In addition, an internal configuration of the housing can be simplified, and an influence of deformation (thermal shift) due to temperature rise can be reduced. As described above, according to this embodiment, generation of the ghost light can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-025991, filed on Feb. 15, 2017, which is hereby incorporated by reference herein in its entirety.

What is claimed is:

1. A light scanning apparatus, comprising:
   a first light source configured to emit a first light beam;
   a first holder configured to hold the first light source, the first holder including an inner wall surrounding a space through which the first light beam passes;
   a second light source configured to emit a second light beam;
   a second holder configured to hold the second light source, the second holder including an inner wall surrounding a space through which the second light beam passes;
   a rotary polygon mirror including a plurality of deflecting surfaces and configured to deflect the first light beam and the second light beam by the plurality of deflecting surfaces;
   a housing including a bottom surface on which the rotary polygon mirror is mounted and a side wall portion on which the first holder and the second holder are mounted, wherein the rotary polygon mirror, the first holder, and the second holder are provided on the housing so that a deflecting surface on which the second light beam is incident is adjacent to a deflecting surface on which the first light beam is incident in a rotation direction of the rotary polygon mirror and an optical path of the first light beam incident on the deflecting surface and an optical path of the second light beam incident on the deflecting surface come close to each other as going to the rotary polygon mirror; and
   a wall portion provided between the first light source and the rotary polygon mirror and between the second light source and the rotary polygon mirror and standing from the bottom surface, the wall portion being configured to block a part of the first light beam reflected by the inner wall of the first holder.

2. A light scanning apparatus according to claim 1, further comprising:
   a third light source configured to emit a third light beam and mounted on the side wall portion so that the third light beam is deflected by the deflecting surface which deflects the first light beam; and
   a third holder configured to hold the third light source, the third holder including an inner wall surrounding a space through which the third light beam passes,
   wherein the first holder and the third holder are mounted on the side wall so that the third light beam is deflected by the deflecting surface which deflects the first light beam and a predetermined angle is formed between the optical path of the first light beam being incident on the rotary polygon mirror without being reflected by the inner wall of the first holder and an optical path of the third light beam being incident on the rotary polygon mirror without being reflected by the inner wall of the third holder.

3. A light scanning apparatus according to claim 2, wherein the wall portion includes a first wall portion configured to block the part of the first light beam reflected by the inner wall of the first holder or a part of the third light beam reflected by the inner wall of the third holder.

4. A light scanning apparatus according to claim 3, further comprising a first aperture portion which has a first opening configured to regulate a width of the first light beam in a main scanning direction and a third opening configured to regulate a width of the third light beam in the main scanning direction,
   wherein the first wall portion is formed integrally with the first aperture portion.

5. A light scanning apparatus according to claim 2, further comprising:
   a fourth light source configured to emit a forth light beam; and
   a fourth holder configured to hold the fourth light source, the fourth holder including an inner wall surrounding a space through which the fourth light beam passes,
   wherein the second holder and the fourth holder are mounted to the housing so that the forth light beam is deflected by the deflecting surface which deflects the second light beam and the predetermined angle is formed between the optical path of the second light beam being incident on the rotary polygon mirror without being reflected by the inner wall of the second holder and an optical path of the fourth light beam being incident on the rotary polygon mirror without being reflected by the inner wall of the fourth holder.

6. A light scanning apparatus according to claim 5, wherein the wall portion includes a second wall portion configured to block a part of the second light beam reflected by the inner wall of the second holder or a part of the fourth light beam reflected by the inner wall of the fourth holder.

7. A light scanning apparatus according to claim 6, further comprising a second aperture portion which has a second opening configured to regulate a width of the second light beam in a main scanning direction and a fourth opening configured to regulate a width of the fourth light beam in the main scanning direction,
   wherein the second wall portion is formed integrally with the second aperture portion.

8. An image forming apparatus, comprising:
   a light scanning apparatus including:
      a first light source configured to emit a first light beam;
      a first holder configured to hold the first light source, the first holder including an inner wall surrounding a space through which the first light beam passes;
      a second light source configured to emit a second light beam;
      a second holder configured to hold the second light source, the second holder including an inner wall surrounding a space through which the second light beam passes;
      a rotary polygon mirror including a plurality of deflecting surfaces and configured to deflect the first light beam and the second light beam by the plurality of deflecting surfaces;

a housing having a bottom surface on which the rotary polygon mirror is mounted and a side wall portion on which the first holder and the second holder are mounted, wherein the rotary polygon mirror, the first holder, and the second holder are attached to the housing so that a deflecting surface on which the second light beam is incident is adjacent to a deflecting surface on which the first light beam is incident in a rotation direction of the rotary polygon mirror and an optical path of the first light beam and an optical path of the second light beam come close to each other as going to the rotary polygon mirror; and a wall portion provided between the first light source and the rotary polygon mirror and between the second light source and the rotary polygon mirror and standing from the bottom surface, the wall portion being configured to block a part of the first light beam reflected by the inner wall of the first holder;

a first photosensitive member on which a latent image is formed by the first light beam emitted from the first light source;

a second photosensitive member on which a latent image is formed by the second light beam emitted from the second light source;

a first developing device configured to develop the latent image formed on the first photosensitive member with toner to form a toner image;

a second developing device configured to develop the latent image formed on the second photosensitive member with toner to form a toner image;

a first transfer member configured to transfer the toner image formed by the first developing device to a transfer-receiving member; and a second transfer member configured to transfer the toner image formed by the second developing device to the transfer-receiving member.

9. A housing, comprising:

a bottom surface on which a rotary polygon mirror including a plurality of deflecting surfaces is mounted;

a side wall portion, on which a first holder configured to hold a first light source and a second holder configured to hold a second light source are mounted, the first light source configured to emit a first light beam being held by the first holder including an inner wall surrounding a space through which the first light beam passes, the second light source configured to emit a second light beam being held by the second holder including an inner wall surrounding a space through which the second light beam passes, a deflecting surface included in the plurality of deflecting surfaces and on which the first light beam is incident being different from a deflecting surface included in the plurality of deflecting surfaces and on which the second light beam is incident, wherein the first holder and the second holder are mounted on the side wall portion so that the deflecting surface on which the second light beam is incident is adjacent to the deflecting surface on which the first light beam is incident in a rotation direction of the rotary polygon mirror and an optical path of the first light beam incident on the deflecting surface and an optical path of the second light beam incident on the deflecting surface come close to each other as going to the rotary polygon mirror; and a wall portion provided between the first light source and the rotary polygon mirror and between the second light source and the rotary polygon mirror and standing from the bottom surface, the wall portion being configured to block a part of the first light beam reflected by the inner wall of the first holder.

10. A housing according to claim 9, wherein the first light source and a third light source configured to emit a third light beam, the third light source being held by a third holder including an inner wall surrounding a space through which the third light beam passes, are mounted on the side wall portion so that the third light beam is deflected by the deflecting surface which deflects the first light beam and a predetermined angle is formed between the optical path of the first light beam being incident on the rotary polygon mirror without being reflected by the inner wall of the first holder and an optical path of the third light beam being incident on the rotary polygon mirror without being reflected by the inner wall of the third holder.

11. A housing according to claim 10, wherein the wall portion includes a first wall portion configured to block the part of the first light beam reflected by the inner wall of the first holder or a part of the third light beam reflected by the inner wall of the third holder.

12. A housing according to claim 11, further comprising a first aperture portion which has a first opening configured to regulate a width of the first light beam in a main scanning direction and a third opening configured to regulate a width of the third light beam in the main scanning direction, wherein the first wall portion is formed integrally with the first aperture portion.

13. A housing according to claim 10, wherein the second light source and a fourth light source configured to emit a fourth light beam, the fourth light source being held by a fourth holder including an inner wall surrounding a space through which the fourth light beam passes, are mounted on the side wall portion so that the fourth light beam is deflected by the deflecting surface which deflects the second light beam and the predetermined angle is formed between the optical path of the second light beam being incident on the rotary polygon mirror without being reflected by the inner wall of the second holder and an optical path of the fourth light beam that being incident on the rotary polygon mirror without being reflected by the inner wall of the fourth holder.

14. A housing according to claim 13, wherein the wall portion includes a second wall portion configured to block a part of the second light beam reflected by the inner wall of the second holder or a part of the fourth light beam reflected by the inner wall of the fourth holder.

15. A housing according to claim 14, further comprising a second aperture portion which has a second opening configured to regulate a width of the second light beam in a main scanning direction and a fourth opening configured to regulate a width of the fourth light beam in the main scanning direction, wherein the second wall portion is formed integrally with the second aperture portion.

* * * * *